United States Patent
Lin

(10) Patent No.: US 8,386,774 B2
(45) Date of Patent: Feb. 26, 2013

(54) LOGGING SYSTEM AND METHOD BASED ON ONE-WAY HASH FUNCTION

(75) Inventor: Chih-Yin Lin, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 599 days.

(21) Appl. No.: 12/337,367

(22) Filed: Dec. 17, 2008

(65) Prior Publication Data

US 2009/0228701 A1 Sep. 10, 2009

(30) Foreign Application Priority Data

Mar. 4, 2008 (TW) ................................. 97107575 A

(51) Int. Cl.
*H04L 9/32* (2006.01)
(52) U.S. Cl. ......... 713/155; 713/179; 713/180; 713/181
(58) Field of Classification Search .................. 713/155, 713/179, 180, 181
See application file for complete search history.

(56) References Cited

U.S. PATENT DOCUMENTS

| | | | | |
|---|---|---|---|---|
| 5,978,475 A | * | 11/1999 | Schneier et al. | 713/177 |
| 7,181,017 B1 | * | 2/2007 | Nagel et al. | 380/282 |
| 2007/0143629 A1 | * | 6/2007 | Hardjono et al. | 713/189 |

FOREIGN PATENT DOCUMENTS

TW 097107575 8/2011

OTHER PUBLICATIONS

SIPO, Office Action mailed Nov. 12, 2010, in corresponding application No. 200810083603.7.

* cited by examiner

*Primary Examiner* — Ellen Tran

(74) *Attorney, Agent, or Firm* — Workman Nydegger

(57) ABSTRACT

A logging system and method based on a one-way hash function are described. The system includes a user system, a trusted third party, and a verifier. The method includes the following steps. The user system records a log file and initializes a message authentication code key and an image code. When the verifier requests the user system for a logging unit corresponding to an operation history, the user system uses a one-way hash function to calculate a check value and returns the check value and an image code sequence. The verifier then verifies the integrity of the check value and the image code sequence through the trusted third party. The trusted third party checks if the image code sequence obtained by the hash calculation equals to the check value through the one-way hash function, so as to verify that the log file of the user system has not been modified.

17 Claims, 3 Drawing Sheets

LOGGING SYSTEM AND METHOD BASED ON ONE-WAY HASH FUNCTION

CROSS-REFERENCE TO RELATED APPLICATIONS

This non-provisional application claims priority under 35 U.S.C. §119(a) on Patent Application No(s). 097107575 filed in Taiwan, R.O.C. on Mar. 4, 2008, the entire contents of which are hereby incorporated by reference.

BACKGROUND OF THE INVENTION

The present invention relates to a system and method for log maintenance, and more particularly to a logging system and method based on the one-way hash function.

Logging mechanisms records activities and events occurring in a computer system. The contents recorded by the logging mechanisms include information like, for example, boot-up and process executions of the system, user log-on logs, application utilization logs, and interaction with external servers, which can used for auditing, accounting, or rollback to a previous system state. In terms of e-commerce or networked services, historical user operations for some services (audio-visual or software service) may be considered as the basis for service charging or as the data source for service providers to analyze user's behaviors.

A logging system involves three roles, which are the user system, the verifier, and the trusted third party. Respectively, the user system maintains a secure log, the verifier checks the log against certain events, and the trusted third party helps to initialize the logging system and to verify the integrity of the log.

A log needs to be secured to be evidential and thus to the minimal satisfies the following three basic security needs. First, a log must ensure the verifiability for a verifier whether events are truly and correctly recorded in the log in the form of log entries. Second, the integrity of existing log entries after the user system is compromised by the attacker and loses the control over secret information used for secure logging must be compliant. Third, the detection capability of deletion or modification of existing log entries after the system is compromised must be provided in the log mechanism.

In addition, if the recorded event contexts are information that user is unwilling to disclose, the user shall be able to keep them private and known to specified verifiers. This would sustain a fourth security requirement:

The privacy of all log entries has to be protected and only qualified verifiers can obtain event information specified by the user system.

For example, let the trusted third party be a bank, and thus a merchant could act as the verifier who has business transactions with the user. What the merchant needs to know is the proof of the business transaction between he and the user, and the banks needs to know is the exact amount to pay from the user account to the merchant account. During the entire logging and verification process, the bank doesn't need to learn the details of the transaction, and the merchant doesn't need to know about any irrelevant transactions.

Currently, several techniques for protecting the integrity and correctness of the logs have been put forward. For example, U.S. Pat. No. 5,978,475 discloses the protocol using one-way hash function, encryption, signature, and other techniques together to protect the log. This implies heavy cryptographic operations are required to realize secure logging. Moreover, in '475 patent the trusted third party needs to learn all the events information in the log to facilitate the verification process, which implies the privacy of the user is not protected herein.

SUMMARY OF THE INVENTION

In view of the above problems of protecting the integrity and correctness of the logs, the present invention is directed to a logging system based on the one-way hash function. A verifying party (a verifier) checks the logs of a verified party (a user system) with the help of a verification server (a trusted third party), so as to ensure that the logs are not changed or altered. For easy comprehension, it is particularly explained that the following "log file" is an embodied form of the so-called "log."

The present invention also provides a logging method based on the one-way hash function. A verified party (a user system) exchanges every logging unit in the log file with a verification server (a trusted third party) to use the one-way hash function to calculate a hash value (an image code). When a verifying party (a verifier) verifies the verified party, the verifying party obtains a hash chain (an image code sequence) from the verified party and then verifies if the hash chain is complete and valid with the assist of the verification server, so as to ensure the integrity and correctness of logs.

In one embodiment, the system of the present invention includes a user system, a trusted third party, and a verifier. The user system records a log file and initializes a message authentication code (MAC) key and an image code (image$_0$). The trusted third party receives and stores the MAC key during the initialization of the logging system and assists verification of the integrity and correctness of the log file of the above user system when the verification operation of logs is performed. The verifier transmits an event verification request to the user system and verifies an event verification response returned by the user system by the use of the one-way hash function and with the assist of the trusted third party, so as to verify that the log file of the user system has not been modified after it was generated.

After receiving the event verification request, the user system adds a logging unit in the log file thereof according to the event verification request, updates the MAC key, and uses the one-way hash function and the MAC key to calculate a check value of the added corresponding logging unit, and generates the event verification response according to the check value and the image code sequence, i.e., a sequence formed by the image codes of all the logging units. The verifier uses the one-way hash function to check correctness of the returned image code sequence and transmits the received check value and image code sequence to the trusted third party. The trusted third party uses the existing shared MAC key and the image code sequence to calculate and obtain the latest MAC key by the use of the one-way hash function, then checks the correctness of the received check value and image code sequence accordingly. A log of a verification succeeded message is returned and recorded if the image code sequence obtained by the hash calculation equals to the check value.

In one embodiment, a logging method based on the one-way hash function of the present invention includes the following steps. First, a user system records a log file and initializes an MAC key and an image code, and safely transmits the initialized shared MAC key to the trusted third party Then, the user system adds a logging unit according to historical operations and updates the log file and the MAC key. After that, the user system receives an event verification request transmitted by the verifier and calculates a check value by the use of the one-way hash function. Then, the verifier receives the check value and an image code sequence, uses the one-way hash function to check correctness of the image code corresponding to the event verification request, and transmits the received check value and image code sequence to the trusted third party. Finally, the trusted third party uses the existing MAC key and the image code sequence to calculate and obtain the latest MAC key by the use of the one-way hash function, then checks the correctness of the above check value and the image code sequence accordingly, and returns and records a log of a verification succeeded message if the image code sequence obtained by the hash calculation equals to the check value.

The logging system and method based on the one-way hash function of the present invention involves initialization, logging (appending) and verification, and log closure. The logging system and method features logging and necessary verification. When a logging unit corresponding to an operation history is added, the user system uses the one-way hash function to generate the image code of the logging unit. When the verifier intends to verify a certain logging unit for the user system, the user system uses the one-way hash function to calculate the check value and returns the logging unit, the check value, and the recorded image code sequence serving as the event verification response. The verifier verifies integrity of the check value and the image code sequence through the trusted third party. Thus every logging unit in the logs of the user system is ensured not being changed, and the logs altered by a malicious attacker may be detected.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
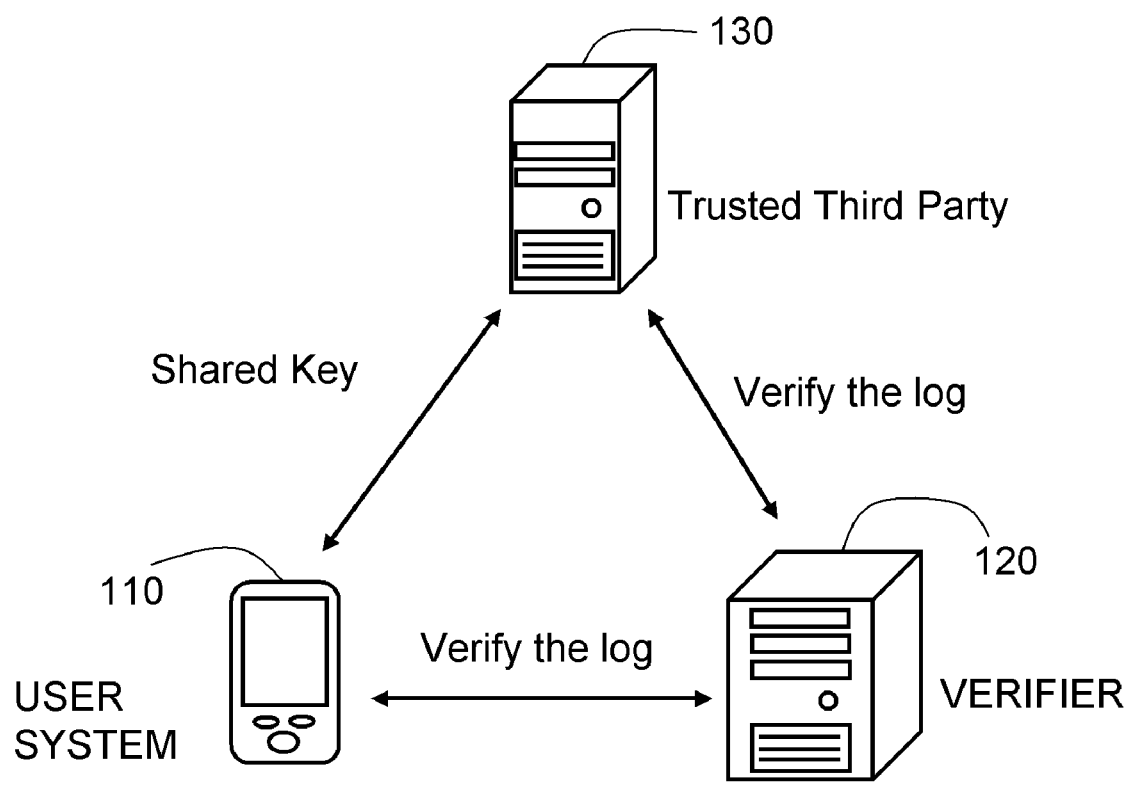
FIG. 1 is a schematic view of architecture of a logging system based on the one-way hash function.

FIG. 1 is a schematic architecture of a logging system based on the one-way hash function. Referring to FIG. 1, the logging system based on the one-way hash function is used for recording activities and events logs of a computer system. The log system also ensures the log not being modified or changed when an error or an attack occurs on the system. In this embodiment, the logging system based on the one-way hash function includes a user system 110, a verifier 120, and a trusted third party 130. The user system 110 may be, for example, an electronic device with calculation capability, such as a personal computer (PC) and a personal digital assistant (PDA). The user system 110 records a log file. The user system 110 is capable of initializing a message authentication code (MAC) key and an image code. The log file includes multiple logging units. When the user system 110 operates (including network operations of accepting a link request or linking to any servers), a corresponding logging unit is generated. A content of the logging unit includes an event number, a timestamp, event context, and an image code. The trusted third party 130 verifies if the log in the electronic device is under attack. The third party server 130 receives and stores the MAC key and assists verification of the integrity and correctness of the log file recorded by the user system 110. The verifier 120 verifies the correctness of any logging units recorded at the user system 110, so as to ensure that the logging unit has not been changed. The verifier 120 transmits an event verification request to the user system 110, and verifies an event verification response returned by the user system 110 by the use of the one-way hash function and with the assist of the trusted third party 130, so as to verify if the log file of the user system 110 is modified.

The verifier 120 transmits an event verification request to the user system 110 to verify the authenticity of a plurality of logging units. When the user system 110 receives the event verification request, the user system 110 adds a logging unit into the log files according to the event verification request. The user system 110 then uses the one-way hash function to calculate the check value, and generates an event verification response according to the check value and the image code sequence. After receiving this event verification response, the verifier 120 uses the one-way hash function to check the correctness of the returned image code sequence, and transmits the received check value and image code sequence to the trusted third party 130 for collaborating the verification. The image code sequence herein refers to the set of the image codes having a plurality of logging units recorded in the log. The trusted third party uses the existing MAC key and the image code sequence to calculate and obtain a latest MAC key by use of the one-way hash function, then checks the correctness of the check value and the image code sequence accordingly, and returns and records a log of a verification succeeded message if the image code sequence obtained by the hash calculation equals to the check value.

In this embodiment, the log of the user system 110 includes a plurality of logging units. One embodiment thereof is expressed as follows:

---

LOG = <
r0={0,timestamp$_0$,event$_0$, 81f0ed1f953ad513b7d06db2efbd1f15}
...
r23={23,timestamp$_{23}$,event$_{23}$, 6bc80b081f0ed1f15aa632c24af55a53}
r24={24,timestamp$_{24}$,event$_{24}$, 9e355c8faff2cf70e173aeffb2efba41 }
r25={25,timestamp$_{25}$,event$_{25}$,8a912a97953c542d6bc0094b824b55d4}
r26={26,timestamp$_{26}$,event$_{26}$, 69c6353b0b07bc917f6a6b64b36570d9}
r27={27,timestamp$_{27}$,event$_{27}$, 216ac14ad513b7d06dddc5dd71f0de2}
... >

---

The MAC key and the image code are initialized along with the initialization of the user system 110. The user system 110 may initialize the MAC key by use of the hash function, for example, an MAC function according to time and/or hardware information of the machine (like a network card number) to maintain the confidentiality. The user system 110 then uses this MAC key to generate the image code by use of the hash function. In this embodiment, the image code is generated by use of the one-way hash function. The function thereof is expressed as follows:

Image code$_i$=one-way hash function(image
code$_0$||image code$_1$|| ... ||image
code$_{i-1}$||S$_i$||timestamp$_i$||event context$_i$);

where S$_i$ is the event number of the i$^{th}$ event in the log. For example, the 1$^{st}$ logging unit in the log represents the event that occurs firstly and expressed by the event number 1. The event context$_i$ is the i$^{th}$ event recorded in the log. The recorded content is not limited to be transmitted and recorded in a manner of cipher text after being encrypted. For example, if the log is a commercial transaction log containing the content such as clients and transactions which are considered to be confidential, the event context of this logging unit may be converted into the cipher text through the encryption technique and then recorded. Timestamp$_i$ is the time when the i$^{th}$ event recorded in the log occurs. The format of the timestamp is not particularly limited herein. Image code$_i$ is the image code of the i$^{th}$ event in the log.

In addition, when the user system 110 generates a new logging unit to be recorded in the log file, the user system 110 further uses the image code in the finally recorded logging unit to update the MAC key. The function thereof is expressed as follows:

$$\text{MAC key}_i = \text{MAC function}(\text{MAC key}_{i-1}, \text{image code}_i);$$

where the image code$_i$ is the added logging unit; the MAC key$_{i-1}$ is the MAC key before being updated; the MAC key$_i$ is the MAC key after being updated. After the MAC key$_i$ is generated, the MAC key$_{i-1}$ is completely deleted from the user system. The MAC function is a mathematical function for calculating the MAC key.

When closing the log file, the user system 110 calculates the new check value by use of the one-way hash function according to the MAC key at that time and deletes all the MAC keys.

Figure 2:
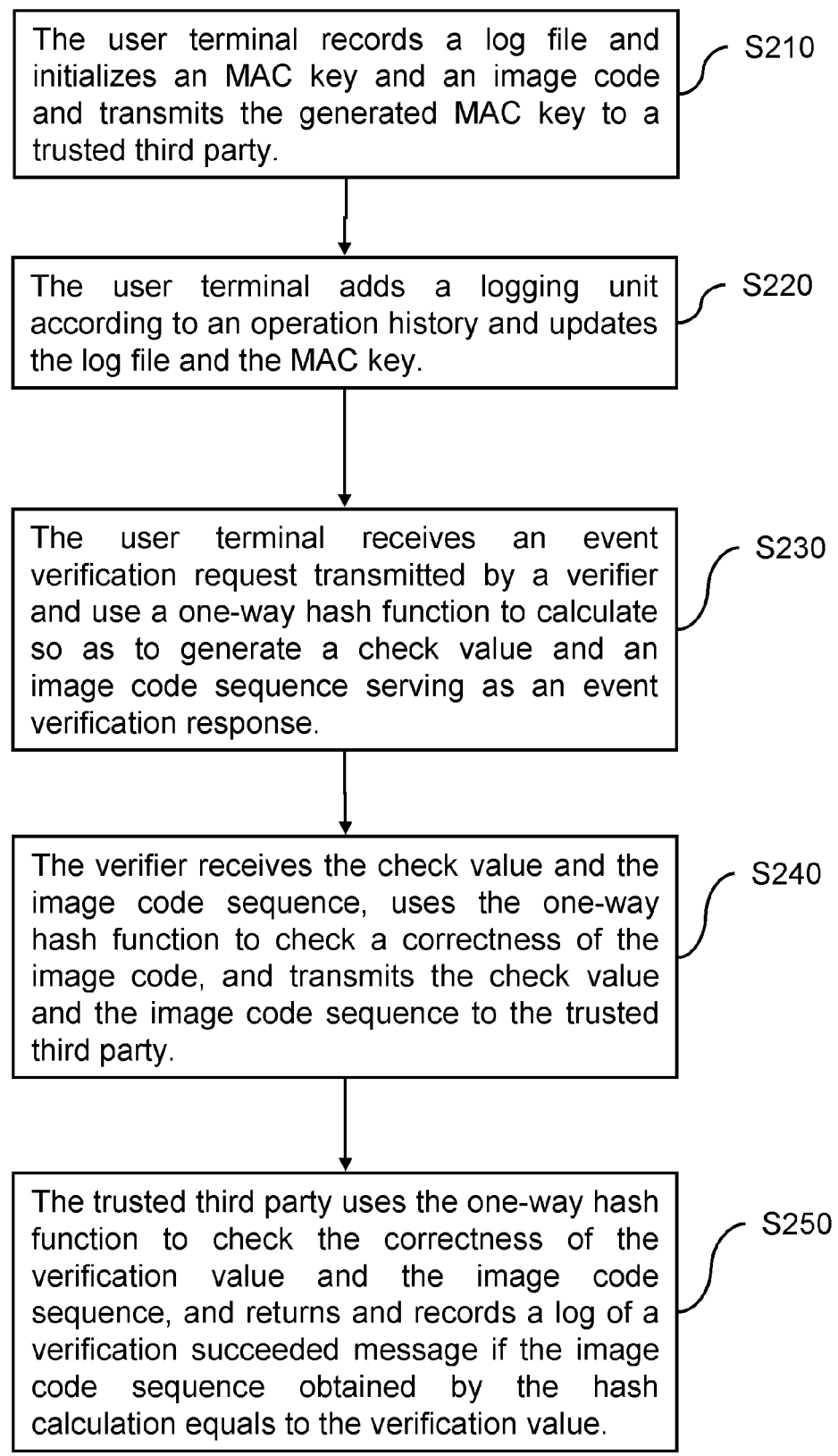
FIG. 2 is a schematic view of process flow of a logging method based on the one-way hash function.

FIG. 2 is a schematic process flow of a logging method based on the one-way hash function. Referring to FIG. 2, the logging method based on the one-way hash function of the present invention includes the following steps. First, a user system records a log file and initializes an MAC key and an image code, and safely transmits the generated initialized MAC key to a trusted third party (step S210). Then, the user system adds a logging unit according to an operation history and updates the log file and the MAC key (step S220). After that, the user system receives an event verification request transmitted by a verifier, and calculates a check value by the use of a one-way hash function (step S230). Then, the verifier receives the check value and the image code sequence. The verifier uses the one-way hash function to check correctness of the image code corresponding to the event verification request, and transmits the received check value and image code sequence to the trusted third party (step S240). Finally, the trusted third party uses the existing MAC key and the image code sequence to calculate and obtain a latest MAC key through the one-way hash function, then checks the correctness of the above check value and the image code sequence accordingly. The verifier then returns and records a log of a verification succeeded message if the image code sequence obtained by the hash calculation equals to the check value (step S250).

In this embodiment, when performing the step S220, a logging unit is further generated according to an operating time of the user system, and is appended after the last logging unit of the log file (at the end of the log file), such that the plurality of logging units in the log are time-dependent. The above step S230 further includes the following sub-steps. First, a new logging unit is generated according to the event verification request and the new logging unit is recorded into the log file. After that, the MAC key is updated. Then, the one-way hash function is used to calculate the check value. The check value, the logging units corresponding to the events to be verified by the event verification request, the initialized image code, and the image code sequence are transmitted to the verifier. In addition, the step S240 further involves the step of respectively substituting the event numbers, the timestamps, the event contexts, and the corresponding image code sequences of the plurality of events to be verified by the event verification request into the one-way hash function operation. Then, match between the operation results and the image codes of the events to be verified are determined. The comparison result of the match is then recorded.

Figure 3:
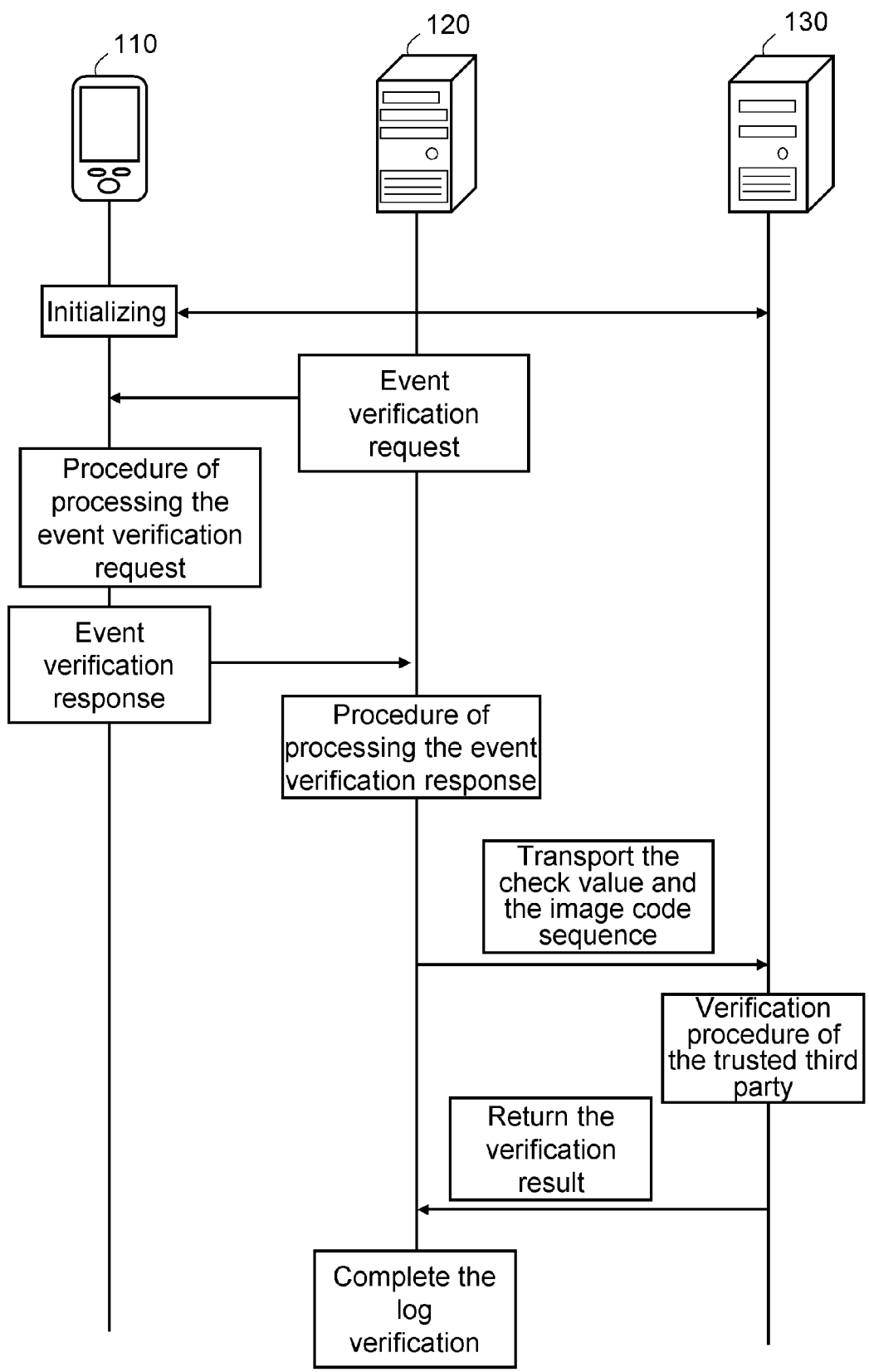
FIG. 3 is a schematic view of an execution timing of a logging system based on the one-way hash function.

For the convenience of explanation for the aforementioned logging method based on the one-way hash function, the following embodiment is provided in accompanying the drawings for illustration. FIG. 3 is a schematic view of an execution timing of a logging system based on the one-way hash function. Referring to FIG. 3, the user system 110 performs initialization and safely transmits the generated initialized MAC key to the trusted third party 130. The trusted third party 130 receives and stores the MAC key. The verifier 120 transmits an event verification request to the user system, for example, a request for checking the 24$^{th}$ and 25$^{th}$ events so as to verify the authenticity of the 24$^{th}$ and 25$^{th}$ events in the log. Upon receiving this event verification request, the user system 110 executes a procedure of processing the event verification request. The user system 110 first regards the received event verification request as a new event and generates a new logging unit (in this embodiment, the new logging unit is the 29$^{th}$ logging unit) which may be recorded as $r_{29} = <S_{29}, \text{Timestamp}_{29}, \text{event}_{29}, \text{image}_{29}>$. Then, the corresponding MAC key $\delta_{29}$ of the 29$^{th}$ logging unit is calculated and the MAC key $\delta_{29}$ is used to calculate a check value by the use of a one-way hash function. After calculating the above check value, the user system 110 generates an event verification response that includes the check value, the 24$^{th}$ logging unit, the 25$^{th}$ logging unit, the 29$^{th}$ logging unit, the 1$^{st}$ image code and an image code sequence (in the format of, for example, $<S1, T1, \text{image}_1>, \ldots, <S28, T28, \text{image}_{28}>$, where S is the event number, T is the time when the event occurs, and image is the image code). After receiving the event verification response, the verifier 120 executes a procedure of processing the event verification response. The verifier 120 uses the one-way hash function to verify the validity of the 29$^{th}$ image code, the 24$^{th}$ image code, and the 25$^{th}$ image code (i.e., uses the one-way hash function which is the same as that of the user system 110 to verify if the generated image code is a valid image code). If the image code is invalid, it indicates that the received logging unit is wrong data, and the user system 110 is decided to be a pretender or a deliberate attacker. If the image code is valid, the verifier 120 transmits the received check value and image code sequence to the trusted third party 130, and verifies whether the log of the user system 110 is changed due to a system error or hacker intrusion with the assist of the trusted third party 130. The verification procedure of the trusted third party 130 is described as follows. First, the trusted third party 130 uses the image code sequence received from the verifier 120 and the existing MAC key to recursively calculate and obtain the latest MAC key, for example, the 29$^{th}$ MAC key, and obtains the check value by the hash calculation, and compares whether the check value obtained by the calculation equals to the received check value, and returns and records a log of a verification succeeded message to the verifier to complete the log verification if they are equal. If not equal, a message that the log verification is failed is returned to the verifier 120 to determine the log of the user system 110 is modified (altered).

What is claimed is:
1. A logging system based on a one-way hash function, comprising:
    a user system, for recording a log file, initializing a message authentication code (MAC) key and an image code, adding a logging unit in the log file according to an event verification request, using the one-way hash function to generate a check value and generating an event verification response according to the check value and an image code sequence;

a verifier, for transmitting the event verification request to the user system and after receiving the event verification response, using the one-way hash function to check the correctness of the received image code sequence from the user system; and a trusted third party, for receiving the initialized MAC key from the user system, receiving the check value and the image code sequence from the verifier, calculating a latest MAC key according to the initialized MAC key and the image code sequence, using the one-way hash function to check the correctness of the check value and the image code sequence and returning a log of a verification succeeded message to the user system if the image code sequence obtained by the hash calculation equals to the check value;

wherein the trusted third party is controlled by a first company, the verifier is controlled by a second company, the first company is different from the second company, and datum transmitted among the verifier, the user system and the trusted third party are unencrypted.

2. The logging system as claimed in claim 1, wherein the image code is generated by the use of the one-way hash function according to the image code sequence and a timestamp and event context.

3. The logging system as claimed in claim 1, wherein the log file comprises a plurality of other logging units, a content of one of the logging units is selected from among an event number, a timestamp, an event context, and an other image code.

4. The logging system as claimed in claim 3, wherein the image code sequence is comprised of the image codes of the logging units.

5. The logging system as claimed in claim 3, wherein after recording the logging units, the user system updates the MAC key by the use of an MAC function according to the image code of the finally recorded logging unit and a preceding MAC key.

6. The logging system as claimed in claim 1, wherein after updating the MAC key, the user system transmits the updated MAC key to the trusted third party.

7. The logging system as claimed in claim 1, wherein when closing the log file, the user system further calculates a new check value by the use of the one-way hash function according to the MAC key at that time and deletes all the MAC keys.

8. A logging method based on a one-way hash function, for recording and verifying an operation log of a user system, comprising:

initializing a message authentication code (MAC) key and an image code in the user system recording a log file;

transmitting the initialized MAC key from the user system to a trusted third party;

adding a logging unit according to an operation history and updating the logging unit into the log file when the user system receives an event verification request from a verifier;

using a one-way hash function to calculate so as to generate a check value and an image code sequence serving as an event verification response according to the event verification request;

transmitting the check value and the image code sequence from the user system to the verifier;

using the one-way hash function to check a correctness of the image code sequence corresponding to the event verification request after the verifier receives the check value and the image code sequence;

transmitting the received check value and the checked image code sequence from the verifier to the trusted third party; and using the one-way hash function to check the correctness of the check value and the image code sequence after the trusted third party receives the check value and the image code sequence and returning a log of a verification succeeded message to the user system if the image code sequence obtained by the hash calculation equals to the check value;

wherein the trusted third party is controlled by a first company, the verifier is controlled by a second company, the first company is different from the second company, and datum transmitted among the verifier, the user system and the trusted third party are unencrypted.

9. The logging method as claimed in claim 8, wherein the step of adding the logging unit further comprises:

generating the logging unit according to a time when the user system operates; and recording the logging unit at the end of the log file.

10. The logging method as claimed in claim 8, wherein a content of the logging unit is selected from among an event number, a timestamp, event context, and the image code.

11. The logging method as claimed in claim 10, wherein the step of adding the logging unit further comprises updating the image code, and the image code is generated by the use of the one-way hash function according to the image code sequence and the timestamp and the event context.

12. The logging method as claimed in claim 8, wherein the log file comprises other logging units, and the image code sequence is comprised of the image codes of the logging units.

13. The logging method as claimed in claim 8, wherein after recording the added logging unit, the user system updates the MAC key by the use of an MAC function according to the image code of the finally recorded logging unit.

14. The logging method as claimed in claim 8, wherein the step of receiving the event verification request further comprises:

generating a new logging unit according to the event verification request and recording the new logging unit into the log file;

calculating the MAC key corresponding to the logging unit of the event verification request; and using the one-way hash function to calculate the check value and transmitting the check value, the logging units corresponding to events to be verified by the event verification request, the initialized image code, and the image code sequence to the verifier.

15. The logging method as claimed in claim 8, wherein the step of using the one-way hash function to check the correctness of the image code corresponding to the event verification request comprises:

respectively substituting event numbers, timestamps, event contexts, and corresponding image code sequences of multiple events to be verified by the event verification request into the one-way hash function operation; and comparing the operation results to determine if matching the image codes of the events to be verified and recording a log of the comparison result.

16. The logging method as claimed in claim 8, wherein after updating the MAC key, the user system transmits the updated MAC key to the trusted third party.

17. The logging method as claimed in claim 8, wherein when closing the log file, the user system further calculates a new check value by the use of the one-way hash function according to the MAC key at that time and deletes all the MAC keys.

* * * * *